United States Patent [19]

Cross et al.

[11] 4,402,897

[45] Sep. 6, 1983

[54] MOLDING AND MACHINING OF ONE PIECE ELECTRICAL SOCKET CONNECTOR

[75] Inventors: William E. Cross, Brookfield; Charles R. Nestor, Niles, both of Ohio

[73] Assignee: General Motors Corporation, Detroit, Mich.

[21] Appl. No.: 355,484

[22] Filed: Mar. 8, 1982

Related U.S. Application Data

[62] Division of Ser. No. 113,335, Jan. 18, 1980, abandoned.

[51] Int. Cl.³ .............................................. B29C 17/10

[52] U.S. Cl. ...................................... 264/118; 264/61; 264/67; 264/154; 264/156

[58] Field of Search .................. 264/154, 156, 61, 67, 264/118

[56] References Cited

U.S. PATENT DOCUMENTS

| | | | |
|---|---|---|---|
| 1,912,980 | 6/1933 | Hoogendorn . | |
| 2,108,635 | 2/1938 | Aiken et al. . | |
| 2,338,210 | 1/1944 | Snyder | 264/154 |
| 2,449,403 | 9/1948 | McDougal | 264/61 |
| 3,178,674 | 4/1965 | Scheller | 339/217 |
| 3,202,959 | 8/1965 | Keller | 339/217 |
| 3,271,729 | 9/1966 | Bakker et al. | 339/217 |
| 3,545,073 | 12/1970 | Walker | 264/156 |
| 3,753,193 | 8/1973 | Teagno et al. | 339/256 R |
| 3,853,388 | 12/1974 | Heimbrock | 339/192 R L |
| 4,061,381 | 12/1977 | Smal | 339/8 P |
| 4,159,160 | 6/1979 | Plyler et al. | 339/217 S |
| 4,186,987 | 2/1980 | Pearce, Jr. et al. | 339/116 C |
| 4,193,857 | 3/1980 | Bannister et al. | 264/61 |
| 4,230,392 | 10/1980 | Leonard, Jr. et al. | 339/117 |

FOREIGN PATENT DOCUMENTS

| | | |
|---|---|---|
| 1157427 | 5/1958 | France . |
| 93843 | 5/1969 | France . |
| 640026 | 5/1962 | Italy . |
| 1227429 | 4/1971 | United Kingdom . |

*Primary Examiner*—James B. Lowe

*Attorney, Agent, or Firm*—F. J. Fodale

[57] ABSTRACT

An electrical socket connector is detachably connected to a post terminal having two axially arranged contacts. The socket connector comprises a one-piece ceramic connector body having a pair of tiered terminal cavities each of which is closed at one end and has a central guide rib. Each cavity retains an appropriately sized channel-shaped contact terminal and communicates with a socket for receiving the post terminal lead wires which project through a boot for sealing the open end of the connector body.

The one-piece connector body is made by dry pressing ceramic powder into a machineable preform with terminal cavities. The preform is then drilled to provide the socket and retention shoulders in the longitudinal ribs.

3 Claims, 11 Drawing Figures

MOLDING AND MACHINING OF ONE PIECE ELECTRICAL SOCKET CONNECTOR

This is a division, of application Ser. No. 113,335, filed Jan. 18, 1980 now abandoned.

This invention relates generally to electrical socket connectors and more particularly to electrical socket connectors for detachable connection to post terminals of oxygen sensors and the like.

U.S. patent application Ser. No. 953,412 filed Oct. 23, 1978 an assigned to the assignee of this invention, now U.S. Pat. No. 4,186,987, discloses an electrical socket connector which is detachably connected to an oxygen sensor post terminal having a number of ring contacts. The socket connector comprises a one-piece connector body which has a corresponding number of longitudinal terminal cavities. The terminal cavities are vertically arranged and have appropriately sized bottom wall slots which receive the post terminal. Each cavity contains a terminal (secured to an insulated wire conductor) which has a channel-shaped contact engaging a particular ring contact across its diameter. The socket connector is sealed by a separate boot which has rear flaps which close a rear assembly opening and seal around the insulated wire conductors. The boot also has an integral collar which provides a vented seal for the post terminal and also functions as a partial socket.

The one-piece connector body is molded and consequently the terminal cavities and bottom wall slots are specially shaped for formation by abutting mold cores which facilitates molding the connector body of high temperature dielectric materials which require higher molding pressures.

The special shaping, however, results in the necessity for open ended terminal cavities to provide an internal terminal retention shoulder and an open socket for the post terminal. Consequently the socket connector requires a rather complicated seal boot with flaps necessitated by the open ended terminal cavities and an integral collar to compensate for the open socket of the connector body. The channel-shaped contact terminals are also complicated by the necessity for guiding spring tongues to compensate for open socket inwardly displaced side rail portions necessitated by the terminal cavity and bottom wall slot shapes.

U.S. patent application Ser. No. 022,821 filed Mar. 22, 1979 and assigned to the assignee of this invention, now U.S. Pat. No. 4,230,392, also discloses an electrical socket connector which is detachably connected to an oxygen sensor post terminal. This latter electrical socket connector incorporates several improvements. The connector body is easy to mold, has a positive socket, retains the terminals and is easy to seal. The terminal construction is also simplified. The connector body, however, is of two-piece construction.

Broadly the object of this invention is to provide an alternate improvement to the electrical socket connector disclosed in the earlier application particularly with regards to an improved one-piece connector body and its method of manufacture which results in retaining the advantage of a one-piece connector body while also permitting the use of simplified terminals and sealing arrangement.

One feature of the invention is that the terminal cavity or cavities each have the necessary internal terminal retention shoulder but also have a closed end and consequently the one-piece connector body is easily sealed.

Another feature of the invention is the one-piece connector body has a positive socket which permits the use of simplified channel-shaped contact terminals.

Another feature of the invention resides in the manufacture of the one-piece connector body from a dielectric material which can be shaped into a partially completed preform in a die cavity or mold and thereafter machined to provide at least a portion of a positive socket and the requisite number of internal terminal retention shoulders.

Another feature of the invention is that the one-piece connector body may be made from a ceramic material and consequently the electrical socket connector can withstand higher temperatures in comparison to those disclosed in the aforementioned patent applications.

Other objects and features of the invention will become apparent to those skilled in the art as the disclosure is made in the following detailed description of a preferred embodiment of the invention as illustrated in the accompanying sheets of drawing in which.

Figure 10:
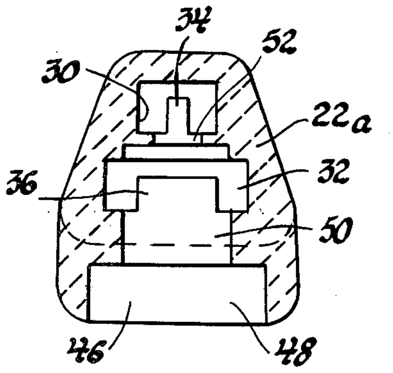
Figure 9:
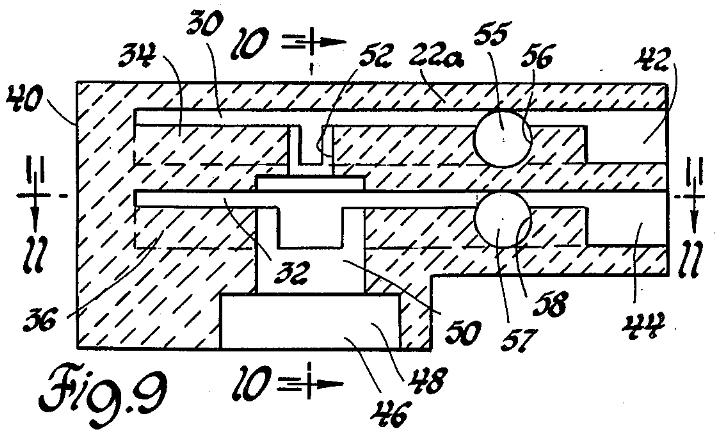
FIG. 9 is a longitudinal section through the pressed blank of FIGS. 6, 7 and 8 after further processing.
Figure 11:
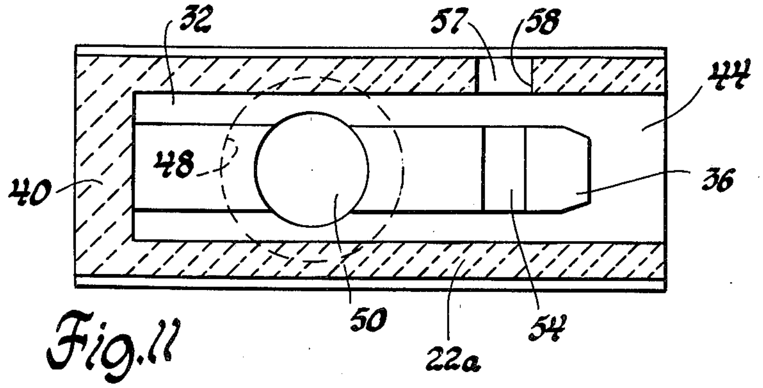

FIGS. 10 and 11 are sections taken substantially along the lines 10—10 and 11—11 of FIG. 9 respectively and looking in the direction of the arrows.

Referring now to the drawing, the socket connector 20 comprises a connector body 22, small and large terminals 24 and 26, a seal boot 28 and a socket seal 29.

Figure 6:
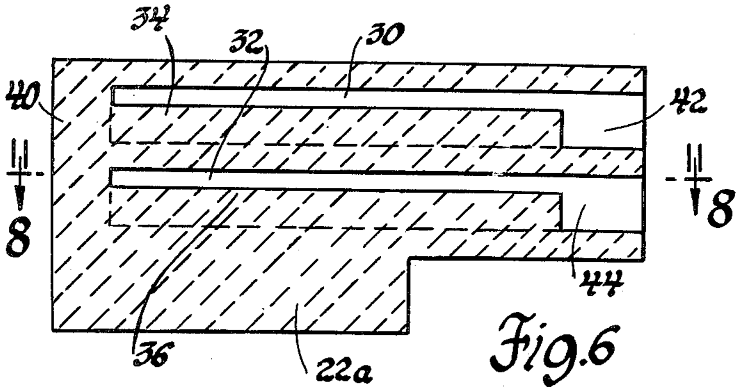
FIG. 6 is a longitudinal section through a pressed blank for making the connector body shown in FIGS. 1–5.
Figure 7:
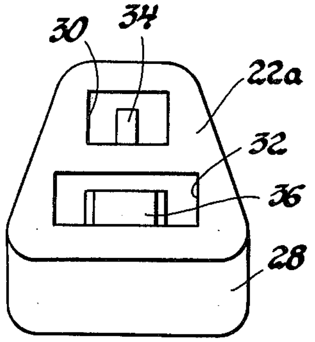
FIG. 7 is an end view of the pressed blank shown in FIG. 6.
Figure 8:
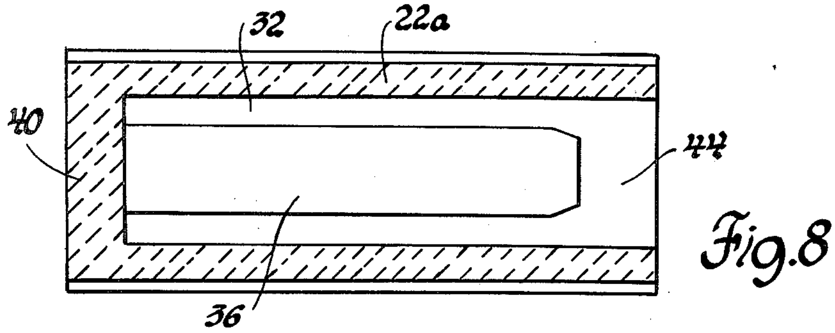
FIG. 8 is a section taken substantially along the line 8—8 of FIG. 6 looking in the direction of the arrows.

The connector body 22 is of one-piece construction and it is made from a ceramic or other dielectric material which can be formed in a die or mold and which can be machined after it is formed. The connector body 22 is preferably made from ceramic powder or granules in a dry pressing operation in which the cooperating dies form a preform or partially completed connector body **22*a* such as shown in FIGS. 6, 7 and 8**.

Figure 5:
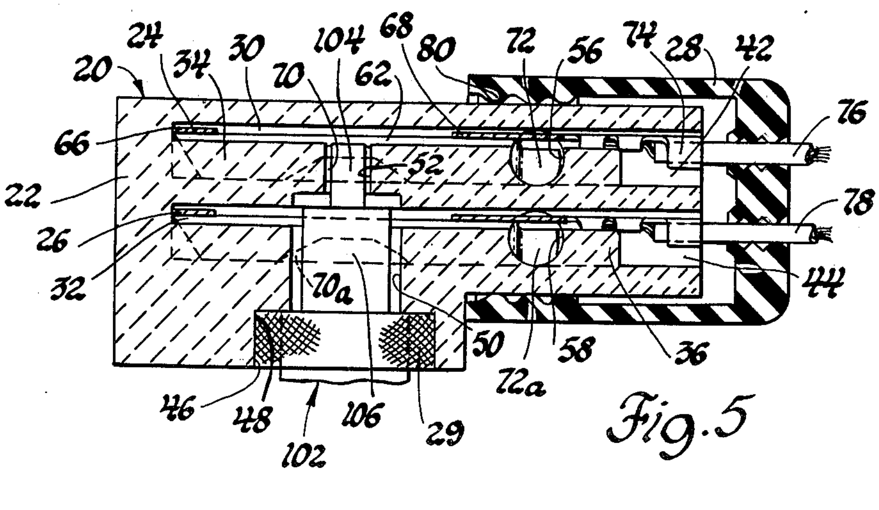
FIG. 5 is a section taken substantially along the line 5—5 of FIG. 2 looking in the direction of the arrows.

The preform **22*a* is elongated, has a generally trapezoidal cross section, and is enlarged at one end for subsequently forming a socket. The preform 22*a* has two blind-ended longitudinal cavities 30 and 32 in a tiered arrangement. The cavities 30 and 32 are rectangular and formed with central guide ribs 34 and 36 respectively. The guide ribs 34 and 36 extend from the front wall 40 forming the blind-end of the respective cavities and continue for a substantial length. The guide ribs 34 and 36 preferably terminate short of the rear cavity openings 42 and 44 leaving clear rectangular cavity end portions for accommodating the terminal insulation crimp barrels as shown in FIG. 5. The cavity shapes are such that the die portions forming them are easily withdrawn through the cavity openings 42 and 44 after the preform 22***a* is pressed.

It is also possible for the guide ribs 34 and 36 to extend the entire length of the cavities 30 and 32 and terminate at the rear openings 42 and 44. In such an event, the insulation crimp barrels would have to be flattened or otherwise modified to fit in the available space.

The connector body 22 is provided by machining or cutting three blind-ended circular holes into the preform 22*a*, preferably before the preform 22*a* is fired and vitrified. The first hole is cut vertically into the enlarged end of the preform 22*a* by a rotary cutting tool to form a stepped socket 46 which communicates with the cavities 30 and 32 as shown in FIGS. 10, 11 and 12. The stepped socket 46 has a larger lower receiving portion 48, an intermediate portion 50 which is larger than the width of the guide rib 36 and a small upper portion 52 which is larger than the width of the guide rib 34. In the cutting operation, the guide ribs 34 and 36 are cut completely through in the vertical direction. In each instance the diameter of the rotary cutting tool is larger than the width of the associated guide rib so that each of the guide ribs 34 and 36 is also cut through in the lateral direction to provide chordwise slots on each side. This is best shown in FIGS. 9, 10 and 11 which shows socket portion 30 extending completely through the guide rib 36 in the vertical direction and also extending through in the lateral direction to form chordwise slots 54 in the two side walls of the guide rib 36.

In some instances it may be possible to provide a portion of the socket 46, particularly the lower portion 48, in the preform 22*a*. This reduces the amount of cutting, however it complicates the dies.

The second and third holes 55, 57 are aligned vertically and cut through one of the connector body side walls to provide access to the rearward portions of cavities 30 and 32 respectively. The rotary cutting tools making the holes 55, 57 also cut through the guide ribs 34 and 36 in the lateral direction forming corresponding partcircular cuts as best shown in FIG. 9. The diameter of the holes 55, 57 preferably matches the heights of the respective cavities 30, 32 which minimizes the amount of cutting while also minimizing the amount of curvature of the forward facing internal terminal retention shoulders 56 and 58 formed in the guide ribs by the partcircular cuts.

The terminals 24 and 26 are similar in construction to each other and to the terminals disclosed in the U.S. patent application Ser. No. 022,821 discussed in the introduction. The smaller terminal 24 comprises a channel-shaped contact portion 60 comprising side rails 62 and 64 connected across the top by webs 66 and 68 at each end. The side rails have a central lower guidance flare 70 and converging latch tangs 72 at their rear ends. The forward ends of the side rails 62 and 64 are also flared outwardly along oblique bend lines to facilitate sliding the channel-shaped contact portion 60 onto the guide rib 34. The rear web 68 has an integral conventional crimp barrel attachment 74 projecting rearwardly which attaches the terminal 24 to an insulated wire conductor 76.

The terminal 26 attached to the insulated wire conductor 78 is essentially the same as the terminal 24 except that its channel-shaped contact portion is wider. Corresponding portions are identified with the same numerals and the suffix letter designation "a".

The terminals 24 and 26 are assembled to the connector body 22 by inserting the terminals through the rear openings 42 and 44. The terminals are locked in place by the converging tangs 72 and 72*a* engaging the retention shoulders 56 and 58. The side rails of the terminals 24 and 26 engage the guide ribs 34 and 36 for proper lateral location of the terminals in the cavities 30 and 32.

The rear openings 42 and 44 are closed by the seal boot 28 which slides on the insulated conductor wires 76 and 78 to the sealing position shown in FIGS. 1 through 5 where the seal boot 28 covers the side wall holes 55 and 57 as well as the rear openings 42 and 44. The open end of the seal boot 28 has three internal circumferential ribs 80 for sealing against the periphery of the connector body 22. The holes in the seal boot end wall for the wires 76 and 78 to pass through also have internal circumferential ribs 82 for sealing around the insulation jackets of the conductor wires.

For high temperature applications, the seal boot is preferably made of silicone which can withstand temperatures up to 527° F. (265° C.). The temperature capability of the socket connector 20, however, is higher when the connector body is made of ceramic since the highest temperature is at the socket 46 which in this instance is ceramic rather than elastomeric or plastic as in the prior patent applications.

The socket seal 29 is an annular member of wire mesh or compacted wire strands, which are preferably made of stainless steel for high temperature application. The annular member is permeable enough to vent the interior of the connector body 22 yet it is efficient in excluding contaminants. The socket seal 29 is retained in the socket portion 48 by a light force fit.

Figure 1:
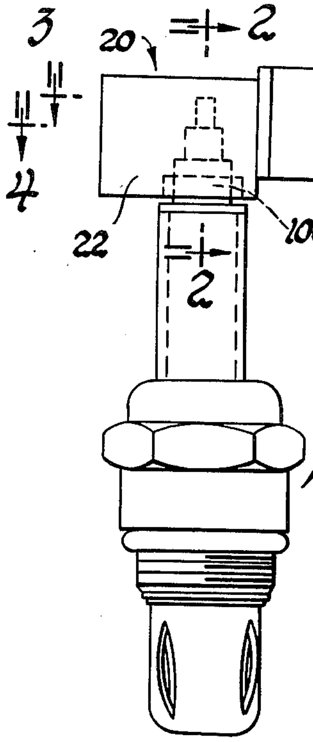
FIG. 1 is a schematic elevation showing an electrical socket connector of this invention detachably connected to an oxygen sensor post terminal.
Figure 2:
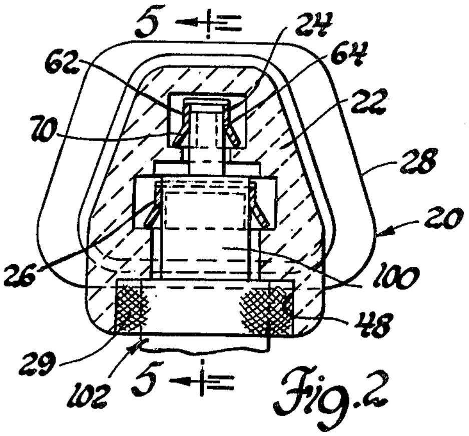
FIG. 2 is a section taken substantially along the line 2—2 of FIG. 1 looking in the direction of the arrows.
Figure 3:
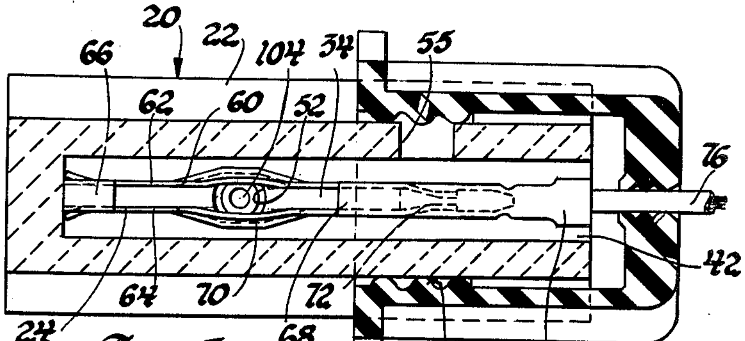
FIG. 3 is a section taken substantially along the line 3—3 of FIG. 1 looking in the direction of the arrows.
Figure 4:
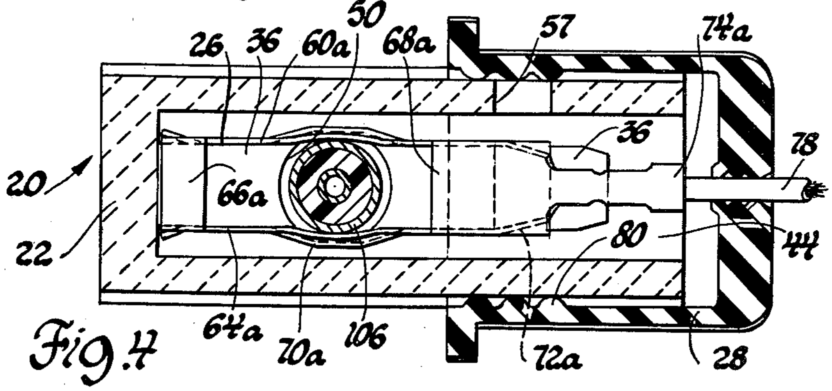
FIG. 4 is a section taken substantially along the line 4—4 of FIG. 1 looking in the direction of the arrows.

The completed socket connector 20 houses the terminal 24 and 26 for detachable connection to the post terminal 100 of the oxygen sensor 102 shown in FIGS. 1 through 5. The socket connector 20 is simply plugged onto the post terminal 100 and the terminals 24 and 26 each biasingly engage the respective ring contacts 104 and 106 at diametrically opposed locations. As shown in FIGS. 3 and 4 the ring contacts 104 and 106 are slightly larger in diameter than the width of the respective guide ribs 34 and 36. Consequently the ring contacts 104 and 106 protrude laterally outwardly through the chordwise slots of the guide ribs 34 and 36 and slightly deform the side rails of the terminals 24 and 26 for a good electrical contact interface. While the oxygen sensor 102 has two ring contacts 104 and 106, other oxygen sensors have post terminals with one, three, or four ring contacts and the socket connector 20 can be suitably modified to house a corresponding number of terminals although the socket connector is particularly advantageous for multi-terminal configurations. Also in some instances it may be desirable to include a connector lock for securing a socket connector 20 to the post terminal 100. In such instances, a sheet metal connector lock for locking the socket connector 20 to the post terminal 100 as well as retaining the seal boot 28 in the sealing position shown in FIG. 5 may be provided along the lines of the connector locks shown in the U.S. Patent Applications discussed in the introduction. A terminal lock has been omitted from this application as it does not form an essential part of the invention and the deletion of the terminal lock is believed to add clarity to the disclosure.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A method of making a one-piece dielectric connector body having a longitudinal cavity for receiving a channel-shaped contact terminal and a vertical socket opening into the cavity for receiving a post terminal to mate with the channel-shaped contact terminal comprising the steps of, shaping in a die cavity or mold, a machineable connector body preform having a blind-ended longitudinal cavity which includes a central vertical rib which extends longitudinally from a front wall of the preform which completely closes the blind end of the cavity, machining a vertical circular hole in the connector body preform which extends vertically through the central vertical rib to provide at least a portion of the vertical socket and which extends laterally through the central vertical rib to provide chordwise slots in opposite side walls thereof, and machining a lateral circular access hole through a side wall of the connector body preform and a corresponding partcircular cut through the central vertical rib in the lateral direction to provide an internal terminal retention shoulder in the cavity facing toward the front wall of the preform.

2. A method of making a one-piece dielectric ceramic connector body having a longitudinal cavity for receiving a channel-shaped contact terminal and a vertical socket opening into the cavity for receiving a post terminal to mate with the channel-shaped contact terminal comprising the steps of, die pressing ceramic powder or granules in a die cavity to provide a machineable connector body preform having a blind-ended longitudinal cavity which includes a central vertical rib which extends longitudinally from a front wall of the preform which completely closes the blind end of the cavity, machining a vertical circular hole in the connector body preform which extends vertically through the central vertical rib to provide at least a portion of the vertical socket and which extends laterally through the central vertical rib to provide chordwise slots in opposite side walls thereof, and machining a lateral circular access hole through a side wall of the connector body preform and a corresponding partcircular cut through the central vertical rib in the lateral direction to provide an internal terminal retention shoulder in the cavity facing toward the front wall of the preform.

3. The method as defined in claims 1 or 2 wherein the diameter of the lateral circular access hole matches the height of the cavity to reduce cutting and curvature of the terminal retention shoulder.

* * * * *